(12) United States Patent
Pechev (10) Patent No.: US 8,965,582 B2
(45) Date of Patent: Feb. 24, 2015

(54) INVERSE KINEMATICS

(75) Inventor: Alexandre Nikolov Pechev, Farnham (GB)

(73) Assignee: The University of Surrey, Guilford, Surrey (GB)

( * ) Notice: Subject to any disclaimer, the term of this patent is extended or adjusted under 35 U.S.C. 154(b) by 566 days.

(21) Appl. No.: 12/660,447

(22) Filed: Feb. 26, 2010

(65) Prior Publication Data

US 2010/0228396 A1    Sep. 9, 2010

Related U.S. Application Data

(63) Continuation-in-part of application No. PCT/GB2008/002905, filed on Aug. 28, 2008.

(60) Provisional application No. 60/966,503, filed on Aug. 28, 2007.

(51) Int. Cl.
*G05B 15/00* (2006.01)
*B25J 9/16* (2006.01)
*G05B 19/408* (2006.01)

(52) U.S. Cl.
CPC ........... *B25J 9/1607* (2013.01); *G05B 19/4086* (2013.01); *G05B 2219/39079* (2013.01); *G05B 2219/40327* (2013.01); *G05B 2219/41405* (2013.01)
USPC ............................ 700/263; 700/262; 700/264

(58) Field of Classification Search
CPC ...................................................... B25J 9/1607
USPC .......................................... 700/67, 263, 262
See application file for complete search history.

(56) References Cited

U.S. PATENT DOCUMENTS 5,159,249 A * 10/1992 Megherbi ................... 318/568.1
2004/0267404 A1* 12/2004 Danko .......................... 700/245
2007/0162164 A1* 7/2007 Dariush ......................... 700/61

FOREIGN PATENT DOCUMENTS

| CN | 1200692 A | 12/1998 |
|---|---|---|
| CN | 1985773 A | 6/2007 |
| JP | 6019528 A | 1/1994 |
| JP | 2003266347 A | 9/2003 |

OTHER PUBLICATIONS

Balestrino et al., "Robust Control of Robotic Manipulators", 9th IFAC World Congress, pp. 2435-2440, 1984.
Wolovich et al., "A Computational Technique for Inverse Kinematics", Proceedings of the 23rd Conference on Decision and Control, pp. 1359-1363, Dec. 1984.

(Continued)

*Primary Examiner* — Jerrah Edwards
(74) *Attorney, Agent, or Firm* — Wegman Hessler & Vanderburg (57) ABSTRACT

A real-time method for controlling a system, the system including a plurality of controlling means each having at least one variable parameter (q) and a controlled element having a trajectory which is controlled by the controlling means, wherein the trajectory is related to the variable parameters by a variable matrix, the method comprising defining a control transfer matrix (K) relating the variable parameters dq to the trajectory dx, and using a feedback loop in which a feedback term is computed that is dependent on an error (e) which is the difference between the desired trajectory (dxd) which can have an arbitrary dimension specified as (m) and a current trajectory (dx).

20 Claims, 4 Drawing Sheets

(56) References Cited

OTHER PUBLICATIONS

Nakamura et al., "Inverse Kinematic Solutions with Singularity Robustness for Robot Manipulator Control", Journal of Dynamic Systems, Measurement, and Control, vol. 108, pp. 163-171, Sep. 1986.

Wampler, II, et al., "Applications of Damped Least-Squares Methods to Resolved Rate and Resolved-Acceleration Control of Manipulators", Journal of Dynamic Systems, Measurement, and Control, vol. 110, pp. 31-38, Mar. 1988.

Doyle et al., "State-Space Solutions to Standard H2 and H-infinity Control Problems", pp. 1691-1696, 1989.

Doyle et al., "State-Space Solutions to Standard H2 and H-infinity Control Problems", IEEE Transactions on Automatic Control, vol. 34, No. 8, pp. 831-847, Aug. 1989.

Maciejewski et al., "A Parallel Algorithm and Architecture for the Control of Kinematically Redundant Manipulators", IEEE Transactions on Robotics and Automation, vol. 10, No. 4, pp. 405-414, Aug. 1994.

Perdereau et al., "Real-Time Control of Redundant Robotic Manipulators for Mobile Obstacle Avoidance", Robotics and Autonomous Systems, Elsevier Science Publishers, pp. 41-59, Oct. 31, 2002.

Pechev, "Feedback-Based Steering Law for Control Moment Gyros", Journal of Guidance, Control and Dynamics, vol. 30, No. 3, pp. 848-855, May-Jun. 2007.

Pechev, "Inverse Kinematics without Matrix Inversion", Proceedings IEEE International Conference on Robotics and Automation, pp. 2005-2012, 2008.

English Translation of Third Office Action issued in Chinese Application 200880113784.1 mailed Dec. 18, 2012.

English Translation of Japanese Office Action issued in Japanese Patent Application No. 2010-522436 mailed Jan. 7, 2013.

\* cited by examiner

```
void FIK(double& q, double& dxd, double& dq)
{
  // Compute the Jacobian at the current sample
  // it is assumed that there exist a mean for the computation of the Jacobian
  // using the value for (q) at the current sample J = computeJacobian(q);

double dx;
  for( j=0; j<m; j++)
  {  dx = 0;
    for( i=0; i<n; i++)
      { dx = dx + J[j][i]*dqt_1[i]; }      // dx = J(q)dq(t-1)
      e[j] = dxd[j]-dx;                    // e = dxd - dx
  } for ( i=0; i<m; i++ )
      zt[i] = A*zt_1[i]+e[i];              // z(t) = Az(t-1) + e double temp;
  for( j=0; j<m; j++)
  { temp=0;
    for( i=0; i<m; i++)
      { temp = temp + P[j][i]*zt_1[i]; }   // tmp = Pz(t-1)
    tmp[j]=temp;
  } for( j=0; j<n; j++)
   { temp=0;
    for( i=0; i<m; i++)
      {temp = temp + J[i][j]*tmp[i];}      // dq = Jt(q)tmp
     dq[j] = temp;
  } for(i=0; i<n; i++)
     dqt_1[i] = dq[i];                     // dq(t-1) = dq for(i=0; i<m; i++)
     zt_1[i] = zt[i];                      // z(t-1) = z(t)
}
```

INVERSE KINEMATICS

CROSS REFERENCE TO RELATED APPLICATIONS

The present application is a continuation-in-part application of International PCT Application Serial No. PCT/GB2008/002905 filed Aug. 28, 2008 and published in the English language on Mar. 5, 2009, which International PCT application, in turn, claims the priority benefit of U.S. Provisional Patent Application Ser. No. 60/966,503 filed Aug. 28, 2007.

FIELD OF THE INVENTION

This invention relates to the inversion of Jacobian matrices. This is also known as the inverse kinematics problem (IK). The IK problem is associated with the manipulation of computer-generated articulated characters with an arbitrary number of joints used in computer graphics for games and animation, keyframing, control of robot manipulators, singularity avoidance methods for the control of Control Moment Gyro mechanisms, protein folding, and many other applications.

BACKGROUND TO THE INVENTION

In applications such as robotics, computer animation, spacecraft control using Control Moment Gyros (CMG) and others, a variable matrix that is a function of a variable parameter, for example (q) or time, and hence varies with time, connects input space to output space.

Figure 1:
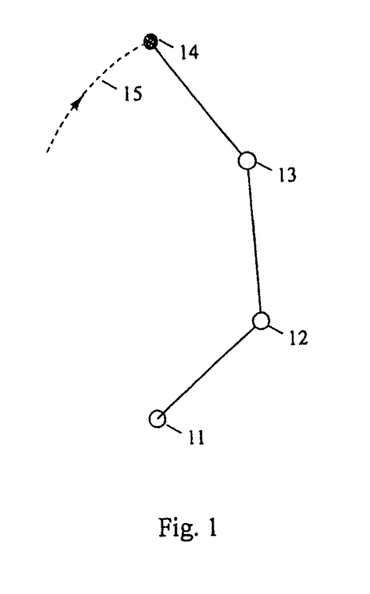
FIG. 1 is an example of a structure, for example a robot manipulator with 3 joints and one end effector position.

Let (x) be used to represent a vector of Cartesian coordinates describing the position and the configuration of an end effector, for example 14 in FIG. 1. For a three dimensional Cartesian space, (x) would have one or more components to represent position and angular rotation. The size (i.e. number of dimensions) of the end-effector space is denoted as (m). For example if the end effector can perform only a three dimensional displacement, then (m=3).

Let (q) be used to describe the joint coordinates and their configuration, for example for joints 11, 12 and 13 in FIG. 1. Each joint can have one or more degrees of freedom. The total number of degrees of freedom in (q) is denoted as (n). For example, if each of the joints in FIG. 1, i.e. 11, 12 and 13, has two degrees of freedom, the total number of degrees of freedom is (n=6).

Then the model of the structure, a manipulator or a computer animation object, can be described as $$x = f(q) \tag{1a}$$

In (Eq.1a), f(q) is a nonlinear function of the joint variables (q).

In many applications it is necessary to compute the joint variables (q) for a given set of desired end effector positions (x). This requires inverting (Eq.1a)

$$q = [f(x)]^{-1} \tag{1b}$$

In (Eq.1b), ([f(x)]^−1) represents the inverse of the mapping from (q) to (x).

Solving (Eq.1b) analytically is a tedious task. A numerical method for solving (Eq.1a) involves differentiating (Eq.1a) from both sides. This gives the kinematic relationship $$dx = J(q)dq \tag{1c}$$

In (Eq.1c) (dq) defines the output space, (dx) defines the input space and (J(q)) is a parameter dependent Jacobian matrix that is computed by differentiating (f(q)) with respect to (q)

$$J(q) = \text{diff}(f(q))/\text{diff}(q) \tag{1d}$$

(Eq.1d), represents the differential of (f(q)) with respect to (q).

In robotics and animation of articulated figures, (x) denotes a vector constructed from angular and linear displacements defined in Cartesian space. (q) is used to describe the joint coordinates and their configurations. (dx) describes velocities defined in Cartesian space. (dq) describes the joint velocities.

In attitude control using Control Moment Gyro mechanisms, (x) is used to describe the total angular momentum of the CMG cluster as known by a skilled person, (q) is constructed by the gimbal angles, (dx) describes components of torque. (dq) denotes the gimbal rates as known by a skilled person.

The dimension (i.e. number of dimensions) of (x) and (dx) is (m).

The dimension of (q) and (dq) is (n).

Typically (m) is less or equal to (n).

For redundant configurations, (m) is less than (n).

In some embodiments of this invention, (m) and (n) can be arbitrarily large.

FIG. 1 is an example of a structure, for example a robot manipulator with 3 joints, 11, 12, 13 and one end-effector, 14. The target trajectory for the end-effector is specified as 15 in FIG. 1 and is defined in three dimensional Cartesian space. In FIGS. 1, 11, 12 and 13 are joint mechanisms that can change angularly or linearly to provide degrees of freedom (n) and to allow 14 to follow the target 15. Each of the joints 11, 12 and 13 can have one, or more degrees of freedom, and the joints can have different numbers of degrees of freedom.

Figure 2:
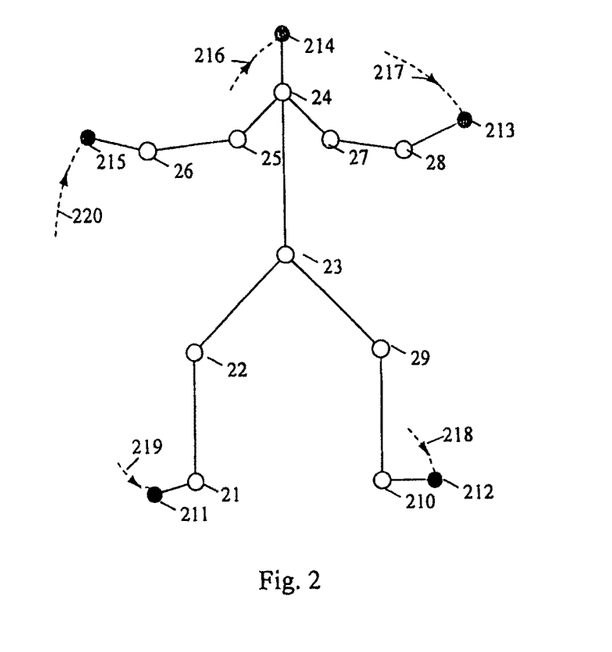
FIG. 2 is a graphic structure that is used in fields such as computer animation.

FIG. 2 is a graphic structure that is used in fields such as computer animation. The particular example of the structure in FIG. 2 has five end effectors, 211, 214, 215, 213 and 212 and ten joints, 21, 22, 23, 24, 25, 26, 27, 28, 29, 210. The structure in FIG. 2 is included only for demonstrative purposes and the IK algorithm described in this invention can work on a structure with (m) degrees of freedom for the end-effectors and (n) degrees of freedom for the joints where (m) and (n) can be arbitrarily large. 216, 217, 218, 219 and 220 are the target trajectories defined in a three-dimensional Cartesian space that the end effectors have to follow.

In robotics, motors or other mechanisms are used to provide linear and or angular momentum to produce displacement and change (q).

In computer graphics, the animation software redraws the figure to produce displacement in (q).

Since the Jacobian in (Eq.1c) depends on (q), a sensor is used to measure (q) or a mathematical model is used to compute, derive or estimate (q).

In this description of the present invention, (dxd) is used to denote a vector of desired values for (dx). (dxd) and (q) are assumed known and provided by a mathematical model or a sensor.

For a given set of desired trajectories (dxd), the inverse kinematics problem (IK) is the problem of solving the inverse of (Eq.1c), that is for a given vector (dxd) how to derive (dq).

$$dq = iJ(q)dxd \tag{2}$$

In Eq. 2 (iJ(q)) represents the inverse of the Jacobian in (Eq.1). If (m) is strictly less than (n), i.e. (m) is not equal to (n), pseudo-inverse methods are used to compute (iJ(q)).

In computer graphics and robotics, (dxd) denotes the desired velocities of the end effectors.

In attitude control using CMGs, (dxd) denotes the desired components of torque.

The problem of the inverse kinematics, which is the subject of the present invention, is how to select the joint variables (dq), i.e. to determine how to manipulate motors or how to redraw the structure in an animation application, such that (dx) follows the desired target trajectory (dxd).

Figure 3:
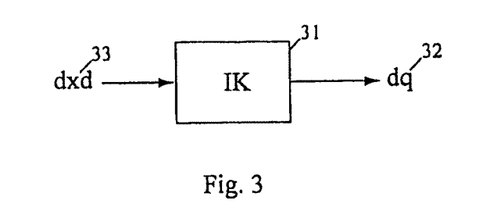
FIG. 3 represents the inverse kinematics block.

FIG. 3 represents the inverse kinematics block, i.e. the processing system which determines the joint variables (dq) required to produce the target trajectory (dxd). The input to this block is (dxd) and the output from the block is (dq). The inverse kinematics block has to deliver (dq) for given (dxd) such that (dx) is same as (dxd) at each iteration.

Solving (Eq.2) for (dq) when (dxd) is given and (J(q)) is a time-varying parameter-dependant Jacobian matrix, is as an essential element or step in computer animation, control of robot manipulators, control of spacecraft and other applications.

Solving (Eq.2) in real time is a tedious and computationally intensive task.

An aim of some embodiments of the present invention is to derive a computationally efficient method for solving the inverse kinematics problem defined in (Eq.2).

Solving the IK problem in (Eq.2) in real-time is a numerically intensive task due to the high number of degrees of freedom (n) in (q).

Increasing the details and the degrees of freedom in the animation of articulated objects, for example, leads to an improved visual representation of the motion. This however leads to highly intensive computations due to the necessity of computing the IK problem in (Eq.2) in real time for a large number of (n).

Since the Jacobian (J(q)) in (Eq.1c) and (Eq.2) is a time-varying function due to its dependence on the parameter (q), at certain configurations, called singular states, (J(q)) becomes rank deficient and as a result the inverse in (Eq.2) can lead to arbitrarily large values for (dq) for a given trajectory (dxd). This is another complication associated with the computation of the inverse kinematics problem.

Traditional IK methods that derive (iJ(q)), i.e. the inverse of the Jacobian, are based on the manipulation of matrices which makes the process highly computationally intensive and difficult to run on a parallel processor architecture.

The damped least squares algorithm (DLS), also known as the singularity robust (SR) algorithm, is traditionally used to solve the problem in (Eq.2) (Y. Nakamura and H. Hanafusa, "Inverse kinematic solutions with singularity robustness for robot manipulator control", Journal of Dynamic systems, Measurements and Control, Vol. 108, September 1986, C. W. Wampler and L. J. Leifer, "Applications of damped least-squares methods to resolved-rate and resolved-acceleration control of manipulators", Journal of Dynamic Systems, Measurement, and Control, 110 (1988), pp. 31-38).

$$iJ(q)=Jt(q)[J(q)Jt(q)+kI]\hat{}-1 \quad (3a)$$

(Jt(q)) is the transpose of the Jacobian. With the form for computing (iJ(q)) defined in (Eq.3a), one can derive (dq) for a given vector (dxd) from (Eq.2), i.e.

$$dq=Jt(q)[J(q)Jt(q)+kI]\hat{}-1 dxd \quad (3b)$$

In (Eq.3b) (Jt(q)) is the transpose of the Jacobian defined in (Eq.1d), (I) is the identity matrix, (k) is known as a damping factor that needs to be adapted and (^-1) represents the inverse operator. When (k=0), (Eq.3) reduces to the pseudo inverse method $$iJ(q)=Jt(q)[J(q)Jt(q)]\hat{}-1 \quad (4a)$$

With the form for computing (iJ(q)) defined in (Eq.4a), using (Eq.2) one can derive (dq) for a given vector (dxd), i.e.

$$dq=Jt(q)[J(q)Jt(q)]\hat{}-1 dxd \quad (4b)$$

At singular states the Jacobian becomes rank deficient and as a result, the inverse in (Eq.4a) does not exist and can not be generated using the mathematical formula of (Eq.4a).

Furthermore, when (J(q)) is near the singular states, solutions based on (Eq.4b) lead to excessively large values for (dq). The damping factor (k) is thus used as a trade-off between exactness of the solution and feasibility of the solution. When (k=0) (Eq.3a) reduces to (Eq.4a); (k) usually is set to (k=0) when the configuration is away from singularity. Near the singularity (k>0). Therefore, the IK method in (Eq.3a) and (Eq.3b) is further complicated due to the need for the adaptation of (k). The adaptation of the damping factor (k) requires additional computation and hence processing power.

Algorithms comprising a feedback loop that uses only the transpose of the Jacobian for the control of robot manipulators have been proposed by W. A. Wolovich and H. Elliott in "A computational technique for inverse kinematics", Proceedings of the $23^{rd}$ Conference on Decision and Control, 1984 and by A. Balestrino, G. De Maria and L. Sciavicco in "Robust control of robotic manipulators", 9th IFAC World Congress, 1984. However, unlike the method proposed in this invention, these algorithms are incapable of avoiding or escaping singular states and fail to deliver solutions when the system is in a singular state.

SUMMARY OF THE INVENTION

The present invention provides a real-time method for controlling a system, the system including a plurality of controlling means or control mechanisms each having at least one variable parameter (dq) and a controlled element having a trajectory which is controlled by the controlling means or control mechanisms. The trajectory may be related to the variable parameters by a variable matrix. The method may comprise defining a control transfer matrix (K) relating the variable parameters dq to the trajectory dx. The method may comprise using a feedback loop in which a feedback term is computed that is dependent on an error (e) which is the difference between a desired trajectory (dxd) and a current trajectory (dx).

The feedback term may be computed repeatedly over a number of cycles so that the current trajectory approaches the desired trajectory.

The output (dq) of the matrix K may have a dimension specified as (n), the desired trajectory dxd may have a dimension (m) and (m) may be less than or equal to (n).

The method may include selecting the control transfer matrix (K) which has a dimension (m) times (n) and determining the form and the numerical values of (K) depending on the properties of the system.

The numerical algorithm which generates (dq) for a given (dxd) may be in the form of a filter. The algorithm may be arranged to require only multiply and accumulate type of instructions.

The method may be performed on a single processor or on a parallel platform.

The matrix (K) may be arranged to deliver solutions for (dq) even when (J(q)) becomes rank deficient.

In the singular state, the error (e) grows in the singular direction and the full structure of (K) may be arranged to generate a non-zero solution for (dq) that produces motion which steers the trajectory away from the singular state.

The system may be a display arranged to display an image of a movable object, the controlling means comprising joints of the movable object and the controlled object comprising an element of the movable object.

The system may be a robotic system including a robot and a control system, the controlled element being an element of a robot, and the controlling means comprising joints of the robot.

The controlling means may comprise gyros of a control moment gyro system.

The system may be a molecular system and the controlling means may comprise atom groups each comprising at least one atom.

The method may further comprise defining at least one dynamic parameter of the system, which may be one or more torques or forces acting on the system or part of the system, or the mass of the system or parts of the system, and using the dynamic parameters in determining solutions for dq.

The present invention further provides a control system for a movable system, the control system being arranged to operate according to the method of the invention.

The present invention further provides a robotic system comprising a robot and a control system according to the invention.

The present invention further provides a control moment gyro system comprising a plurality of gyros and a control system according to the invention.

The aim of some embodiments of the present invention is to derive a computationally efficient, real time, numerical method for solving the inverse kinematics problem defined in (Eq.2).

In addition some embodiments of the present invention are singularity robust in the sense that the solution exists even for a situation when the Jacobian matrix (J(q)) is rank deficient or singular.

In addition, the algorithms in some embodiments of this invention do not require the computation of a damping factor.

The present invention therefore provides a real-time method for computing numerically the inverse of a variable matrix, in which the method uses a feedback loop in which the desired trajectory (dxd) which can have an arbitrary dimension specified as (m) is compared with the current trajectory (dx) to generate the error (e). This comparison may be made at every cycle at which the inverse kinematics problem is computed. The error (e) may be used as an input to a control transfer matrix (K) which generates the required output (dq). (dq) can have an arbitrary dimension specified as (n), (m) is less or equal to (n).

The matrix may vary with time. For example it may be time dependent or dependent on another parameter that varies with time.

The method may be a computer implemented method.

The inverse kinematics problem is the problem of computing the inverse of a time-variable and parameter-dependent matrix. It has application, for example, in robot control, control and manipulation of computer-generated articulated characters with an arbitrary number of joints and end-effectors, keyframing applications, control of spacecraft using Control Moment Gyro mechanisms and other things.

The method may include a method for selecting the feedback compensator (K) which has a dimension (m) times (n) and a method for determining the form and the numerical values of (K) depending on the properties and the structure for which the inverse kinematics problem is being solved.

The method may use a numerical implementation of the algorithm which generates (dq) for a given (dxd) and is performed as a filter that requires only multiply and accumulate type of instructions which can be run on a single processor or on a parallel platform.

In some embodiments (K) delivers solutions for (dq) even when (J(q)) becomes rank deficient. At the singular state, the error (e) may grow in the singular direction and the full structure of (K) may generate non-zero solutions for (dq) that produce motion which steers away the trajectory from the singular state. As a result singularity avoidance can be embedded into the proposed algorithm.

The present invention therefore can provide a computationally efficient and singularity robust method for solving the inverse kinematics problem.

The present invention further provides a method of controlling movement of a system, the method including the method of the invention. The system may be a jointed system, such as a robot arm, or another movable system such as a spacecraft.

The present invention further provides a control system for a movable system, the control system being arranged to operate according to the method of the invention.

The present invention further provides a method of generating a graphic image of a movable object, the method including the method as defined in any of the preceding paragraphs.

The present invention further provides a display system comprising processing means arranged to perform the method of any of the preceding paragraphs thereby to generate image data, and display means arranged to display the image. For example the system may comprise a gaming machine or other computer system.

Preferred embodiments of the present invention will now be described by way of example only with reference to the accompanying drawings.

DESCRIPTION OF THE PREFERRED EMBODIMENTS

In one embodiment of the invention:
1) There exists a multiplication means
2) There exists an addition means.
3) There exists a subtraction means.
4) There exists a Jacobian store means such as a memory block with the dimensions (m) times (n) that can store the Jacobian.
5) There exists a means that provides (dxd).

6) There exists a means such as a mathematical model or a sensor that can provide (q).
7) There exists a parameter store means such as a memory block with a dimension (m) that can store a parameter (z(t−1))
8) There exists a parameter store means such as a memory block with a dimension (m) that can store a parameter (dq(t−1))
8) There exists a parameter store means such as a memory block with a dimension (m) that can store a parameter (dx)
9) There exists a parameter store means such as a memory block with a dimension (m) that can store a parameter (tmp)
10) There exists a parameter store means such as a memory block with a dimension (m) that can store (A); If A is an identity matrix multiplied by a scalar, then the memory block needs to be of a dimension (1) to store only the scalar.
11) There exists a parameter store means such as a memory block with a dimension (m) times (m) that can store (P).

The above means are usually provided by a general purpose processor, for example a personal computer or a microprocessor or a microcontroller or a digital signal processor or it could be a special-purpose build arithmetic and memory block.

The object of this embodiment of the present invention is to provide a computationally efficient and singularity robust real-time method for solving (Eq.2) which does not require the computation of a matrix inversion and a damping factor. The Jacobian in (Eq.2) used for the solution can represent the kinematics of a robotic manipulator, a computer animation character, or can be associated with the control of spacecraft or can be associated with other applications where inversion of a matrix, often referred to as a Jacobian matrix that depends on a variable parameter, for example (q), is necessary.

Figure 4:
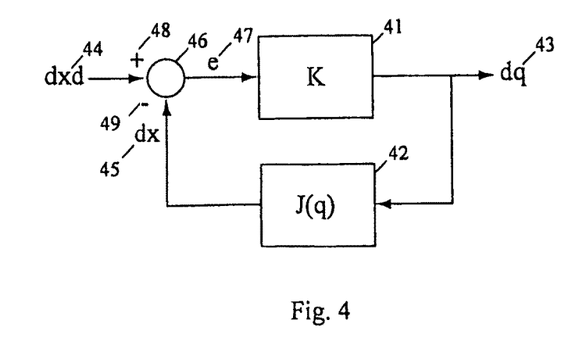
FIG. 4 represents the feedback form of the inverse kinematics solution according to a first embodiment of the present invention.

First a feedback loop is proposed and constructed as in FIG. 4. This feedback loop is computed at every cycle and thus it runs in real time. The error 47 between the generated (dx) 45 and the demanded (dxd) 44 vectors is used as an input to the control law (K), 41. This control law generates the required (dq), 43, such that the error 47 is driven to a vanishingly small value. 46 is a summator, 48 denotes a positive sign and 49 denotes a negative sign.

The feedback loop in FIG. 4 provides a mechanism for deriving (dq) from (dxd) for a given Jacobian (J(q)). The feedback loop in FIG. 4 essentially replaces the IK block in FIG. 3. Using the feedback loop in FIG. 4, the following relationship can be derived $$dq = K[JK+I]^{-1} dxd \qquad (5)$$

In (Eq.5) (K) is a control transfer matrix or a control law that is derived as a part of this embodiment of the invention, (J) is the Jacobian matrix derived from (Eq.1d) and (^−1) represents the inverse operator. An important element in this and other embodiments of the invention is the derivation of (K) and the selection of the form of (K) to provide singularity avoidance properties. (K) also needs to be adapted to account for the variable nature of J(q).

(K) is a full transfer matrix of transfer functions, having non-zero off-diagonal elements, as known by a skilled person in order to provide singularity avoidance properties in the loop. (K) has dimensions (n) times (m).

(K) is a function of (q), i.e. it is adapted as known by a skilled person, to account for the time-variable nature of the Jacobian and its dependence on (q).

When the Jacobian becomes rank deficient then the error (e) would grow in one direction since (J(q)) will be delivering zero output at that particular direction. The non-zero elements of (K) will then generate the necessary output (dq) which will steer the trajectory from the singular direction, resulting in a vanishingly small error (e) and good tracking of the target.

The error 47 in the feedback loop in FIG. 4 describes the discrepancy between the desired variable (dxd) and the actual variable computed from (Eq.1c)

$$e = dxd - J(q)dq \qquad (6)$$

The error in (Eq.6) can be made arbitrary small by selecting (K) appropriately. Provided that (K) is known, (dq) can be computed from (Eq.5).

Real Time Implementation for Fixed Sampling Interval

If the inversion of the Jacobian of the parameter dependent matrix, referred to as a Jacobian matrix herein, is required to be preformed at regular time intervals (typical applications but not the only ones are robotics control and spacecraft control), known as sampling intervals by a skilled person, then the following algorithm can be used.

The format of (K), in this embodiment of this invention, is given in the following discrete form $$K: z(t) = Az(t-1) + e \qquad (7a)$$

$$dq = Jt(q)Pz(t-1) \qquad (7b)$$

(Eq.7a) and (Eq.7b) together represent the feedback loop and block (K) in FIG. 4 and (Eq.5).

(Eq.7a) and (Eq.7b) together connect the error (e) in (Eq.6) to (dq).

(Eq.7a) and (Eq.7b) are run together at every cycle in real-time at which the inverse kinematics problem is solved to find values of dq to achieve the desired result for dxd. The time difference between two successive samples, or the time between two successive executions of the IK algorithm, is known by a skilled person as a sampling time (dt).

In (Eq.7a) (A) is a negative definite diagonal matrix with dimensions (m) times (m).

In (Eq.7a) (P) is a positive definite full matrix with dimensions (m) times (m).

In (Eq.7b) (Jt(q)) is the transpose of the Jacobian derived in (Eq.1d) with dimensions (n) times (m).

In (Eq.7b) the transpose of the Jacobian (Jt(q)) is recomputed at every sample using the current value of (q). (q) is provided by a sensor or a mathematical model.

In (Eq.7a) and (Eq.7b) (z(t)) is a vector of state variables from a dimension (m).

In (Eq.7a) (z(t−1)) is a vector of state variables from a dimension (m).

In (Eq.7a) and (Eq.7b) (z(t−1)) is delayed by one sample period equal to the (dt) value of (z(t)). To compute the delayed value, a memory element from a dimension (m) is necessary. The delay of one sample equal to (dt) is denoted herein as D(dt).

$$z(t-1) = D(dt)z(t) \qquad (8)$$

In (Eq.7a) and (Eq.7b) (z(t−1)) represents the value of (z(t)) computed from (Eq.7a) at the previous iteration.

(Eq.7a) and (Eq.7b) together represent a filter that allows computing (dq) for a given error (e).

(Eq.7a) and (Eq.7b) together with (Eq.6) is the result of this embodiment of the invention and provide a full algorithm for solving the inverse kinematics problem. This algorithm is summarised below.

$$e = dxd - J(q)dq(t-1) \qquad (9a)$$

$$z(t) = Az(t-1) + e \qquad (9b)$$

$$dq = Jt(q)Pz(t-1) \qquad (9c)$$

(Eq.9a), (Eq.9b) and (Eq.9c) together allows computing (dq) for a given desired trajectory (dxd).

Figure 5:
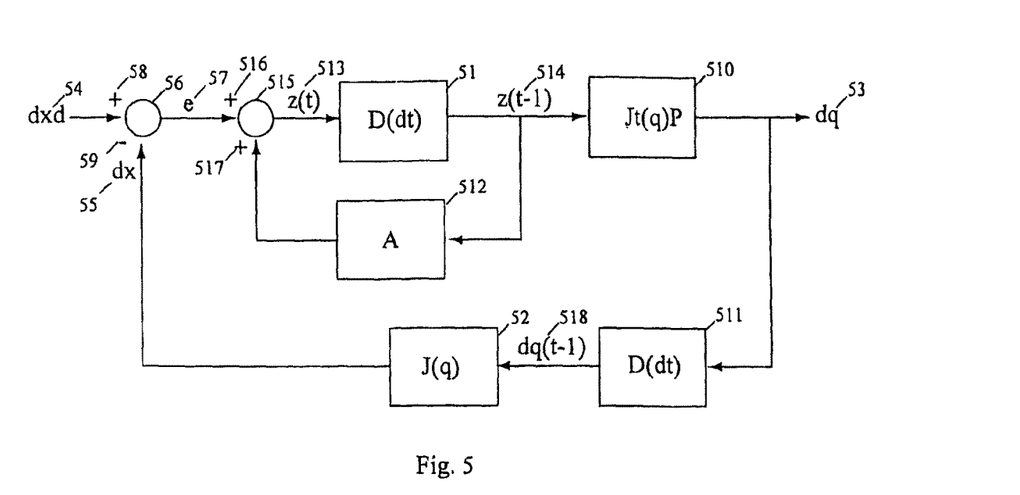
FIG. 5 is an expanded version of the feedback inverse kinematics law depicted previously in FIG. 4.

(Eq.9a), (Eq.9b) and (Eq.9c) are represented in a graphical form in FIG. 5, which is the expanded version of FIG. 4. FIG. 5 reflects the real-time implementation and demonstrates the filtering nature of the algorithm. D(dt), 51 and 511, is a delay block and represents a memory where the value for (z(t)), 513, and the value of (dq), 53, are stored. (A), 512, is defined in (Eq.16), P in 510 is defined in (Eq.20). (Jt(q)) in 510 is the transpose of the Jacobian computed using values for (q) of the current sample. (q) is provided by a sensor or a mathematical model. (z(t)), 513, is computed from (Eq.9b), (J(q)), 52, is the Jacobian computed using values for (q) of the current sample. (q) is provided by a sensor or a mathematical model. (e) is the error between the demanded trajectory (dxd), 54, and the actual trajectory (dx), 55. 56 and 515 represent a summator block, 58, 516 and 517 represent the positive sign and 59 represents the negative sign. (z(t−1)), 514, is the value of (z(t)), 513, as computed in the previous sample or iteration. (dq(t−1)), 518, is the value of (dq), 53, as computed in the previous sample or iteration.

(Eq.9a), (Eq.9b) and (Eq.9c) together replace the IK block in FIG. 3.

(Eq.9a), (Eq.9b) and (Eq.9c) together represent a new algorithm that replaces (Eq.2).

(Eq.9a), (Eq.9b) and (Eq.9c) together represent an algorithm for solving the inverse kinematics (IK) problem.

(Eq.9a), (Eq.9b) and (Eq.9c) are executed at every cycle in real time.

(Eq.9a), (Eq.9b) and (Eq.9c) perform operations similar to those of a filter and thus require only accumulate and multiply instructions. The computation is shown in a filter form in FIG. 5.

In (Eq.9a) (dq(t−1)) is the delayed, by one sample period equal to (dt), value of (dq(t))

$$dq(t-1) = D(dt)dq \quad (10)$$

Real Time Implementation for Variable Sampling Interval

For another class of applications of inverse kinematics, the inversion of the Jacobian matrix, or the parameter dependent matrix, is performed in real time but not at a fixed sampling rate. For example in computer graphics and synthesis of motion in articulated character animation, the new positions of the end points (or end-effectors as 14 in FIGS. 1 and 211, 212, 213, 214, 215 in FIG. 2) are defined at a predefined rate, sometimes referred to as a frame rate. Within a frame (or time interval) the inverse kinematics task is solved several times sequentially until the end points or end effectors reach the required positions. Sometimes these sequential solutions within a frame are referred to as iterations. Within the frame several iterations of inverse kinematics are executed until the end-effectors or the end points reach the required levels. Each iteration is executed by the computer programme at irregular intervals that are not fixed and vary depending on the software loading. For these applications, the following modified algorithm can be used to compute the inverse kinematics, or the values of dq, at every iteration:

$$dq = Jt(q)Pz(t-1) \quad (9d)$$

$$z(t) = z(t-1) + h(Az(t-1) - J(q)dq) + h \, dxd \quad (9e)$$

Therefore (Eq.9d) and (Eq.9e) represent a format of K and the feedback loop in FIG. 4 according to a further embodiment of the invention.

In this embodiment of the invention, in addition to the components of the previous embodiment:

12) There exists a parameter store means such as memory block with dimensions (1) that can store h
13) There exists a parameter store means such as memory block with dimensions (n) that can store bdq
14) There exists a parameter store means such as memory block with dimensions (n) that can store dq0
15) There exists a parameter store means such as memory block with dimensions (n) that can store dq_full
15) There exists a parameter store means such as memory block with dimensions (n) that can store V.

Eq.8 is used to compute z(t−1) from z(t). h is a constant that needs to be tuned for the application; h is selected such that this constant is positive and less than or equal to 50% of the minimal time constant of a plant (or system) described by the following system matrix, as known by a skilled person, (A−J(q)Jt(q)P). h depends on the selection of A, P and the current Jacobian value J(q). One can also fix the value of h, for example h=2e−2, and then select A and P. Eqs. 9d and 9e are computed at every iteration until dq is very small or the end-points (or end-effectors) reach the desired positions as required for the current frame. Eqs. 9d and 9e are the first order integration solution for the feedback inverse kinematic law in FIG. 4. Higher order integrators can be also used. In Eq. 9d, dq can be multiplied by a gain, different for each degree of freedom, to adjust for differences in the gains, i.e. dq=V Jt(q)Pz(t−1), where V=[v1, v2, . . . , vn] defines the gain for each degree of freedom n.

Next the derivations of (P) and (A) are given.

Algorithm for the Derivation of (A) and (P) in (Eq.9a-c)

(A) in (Eq.7a) and (Eq.9b) is a negative definite diagonal matrix with dimensions (m) times (m). (A) in total has (m) elements $$A = \begin{vmatrix} -a1 & 0 & 0 & 0 & \ldots & 0 \\ 0 & -a2 & 0 & 0 & \ldots & 0 \\ 0 & 0 & 0 & 0 & \ldots & -am \end{vmatrix} \quad (11)$$

(a1), (a2), (a3), . . . , (am) are positive real scalars defining frequencies at lower limits and the error between (dx) and (dxd). Depending on the dynamic behaviour of the system, a robot manipulator or a graphical structure or a control moment gyro steering law, (a1) to (am) have to be appropriately adjusted. If the behaviour of all (m) degrees of freedom is equally weighted then (a1)=(a2)= . . . =(am)=(a) can be set to the same value (a). For a CMG control system with fast gimbal inertia, (a) can be set for example to $$a1 = a2 = \ldots am = a = \exp(0.05dt) \quad (12a)$$

(dt) is the sampling period as defined above and (exp) represents the exponent operator.

For a graphical structure, one can use the example value below $$a1 = a2 = \ldots am = a = \exp(5dt) \quad (12b)$$

(P) in (Eq.7b) and (Eq.9c) is a positive definite symmetric matrix as known by a skilled person. It may be a full matrix or a diagonal matrix.

To find (P), first a matrix denoted as (Pa) is computed that is the solution to a Riccati equation as known by a skilled person (Doyle, J., Glover, K., Khargonekar, P., and Francis, B., "State-space solutions to standard H2 and H-infinity control problems" IEEE Transactions on Automatic Control, Vol. 34, 1989, pp. 831-847.)

$$Mt*Pa + Pa*M - Pa*(B2*(V)^{-1}*B2t - s^{-2}*B1*B1t)*Pa + Ct*C = 0 \quad (13)$$

For the derivation of (Pa), six matrices are defined, (B1), (B2), (M), (V) and (C) in addition to a positive, nonzero scalar (s).

(B1) is an identity diagonal matrix with dimensions (m) times (m). (B1t) is the transpose of (B1).

(B2) is a matrix with dimensions (m) times (n) and is equal to (−1) times the Jacobian (J(q)) computed at some nonzero configuration (q)=(q0)

$$B2 = -J(q0) \tag{14}$$

(q0) has a dimension (n) and could be constructed by any combination of nonzero values for the variables (q). (B2t) is the transpose of (B2).

It is important to note that (J(q0)) must have nonzero singular values.

(C) has dimensions (n+m+m) times (m). (C) is partition as below $$C = \begin{vmatrix} 0 \\ w^*I \\ 0 \end{vmatrix} \tag{15}$$

The first group is constructed from (n) times (m) elements that are equal to zero.

The second group which has a dimension of (m) times (m) is equal to an identity matrix (I) which has (m) times (m) elements multiplied by a positive scalar (w) which defines a cut-off frequency in the loop in FIG. 4, for example w=4 rad/s. (w) needs to be appropriately adjusted depending on the application.

The third group is constructed from (m) times (m) elements that are equal to zero.

(M) in (Eq.13) is a negative definite diagonal matrix with dimensions (m) times (m). (M) in total has (m) elements $$M = \begin{vmatrix} -m1 & 0 & 0 & 0 & \ldots & 0 \\ 0 & -m2 & 0 & 0 & \ldots & 0 \\ 0 & 0 & 0 & 0 & \ldots & -mm \end{vmatrix} \tag{16}$$

(m1), (m2), (m3), ..., (mm) are positive real scalars defining the attenuation at lower frequencies for the error between (dx) and (dxd). Depending on the dynamic behaviour of the system, a robot manipulator or a graphical structure or a control moment gyro steering law, (m1) to (mm) have to be appropriately adjusted. If the behaviour of all (m) degrees of freedom is equally weighted then (m1)=(m2)= ... =(mm) can be set to the same value. For a CMG control system with fast gimbal inertia, these can be set for example to $$m1 = m2 = \ldots mm = 0.05 \tag{17a}$$

For a graphical structure, example value is $$m1 = m2 = \ldots mm = 5 \tag{17b}$$

(Mt) is the transpose of (M).

(V) in (Eq.13) is a positive definite diagonal matrix with dimensions (n) times (n). (V) in total has (n) elements $$V = \begin{vmatrix} v1 & 0 & 0 & 0 & \ldots & 0 \\ 0 & v2 & 0 & 0 & \ldots & 0 \\ 0 & 0 & 0 & 0 & \ldots & vn \end{vmatrix} \tag{18}$$

(v1), (v2), (v3), ..., (vn) are positive real scalars defining the square of the maximum rate, possibly in rad/s or m/s, for each degree of freedom (q) that the particular system can achieve. Depending on the dynamic behaviour of the system, a robot manipulator or a graphical structure or a control moment gyro steering law, (v1) to (vn) have to be appropriately adjusted. If all (n) degrees of freedom are constructed by mechanisms with similar characteristics, then (v1)=(v2)= ... =(vn) can be set to the same value. For a CMG control system with fast gimbal inertia, these can be set for example to $$v1 = v2 = \ldots = vn = 1.8 * 1.8 \tag{19a}$$

For a graphical structure, an example value is $$v1 = v2 = \ldots = vn = 1 * 1 \tag{19b}$$

(s) in (Eq.13) is a scalar. The following algorithm is used to determine (s).

step-1: First (s) is set to a large number, for example s=100
step-2: For this value for (s), (Pa) is determined by solving (Eq.13).
step-3: If the solution exists and (Pa) is a positive definite matrix, (s) is reduced, for example (s)=(s)/2 and the algorithm continues from step-2.
step-4: if for the new value for (s) (Eq.13) does not generate a positive definite solution, then the last positive definite solution (Pa) is used as a solution to the Riccati equation in (Eq.13).

Once (Pa) is computed from (Eq.13), (P) in (Eq.7b) and (Eq.9c) is computed by multiplying (Pa) by the maximum rate for one of the degrees of freedom as defined in (Eq.19a) or (Eq.19b), i.e.

$$P = (v1) * Pa \tag{20}$$

In many applications, including computer animation, P and A in Eqs. 9d and 9e can be selected as constants. This reduces considerably the computational demand. To compute P and A, the following algorithm can be used as an alternative to the algorithm described above:

Step-1: Select A, A is typically a negative variable taking values from −0.0001 to −1000. Typical values for a 95 degrees of freedom skeleton is A=−20.
Step-2: Take the Jacobian at a current joint combination J(q) and compute $$JJnorm = sqrt(trace(J(q)Jt(q)))$$

where trace(J(q)Jt(q)) is the trace of the matrix or the sum of the elements along the main diagonal of (J(q)Jt(q)) and sqrt is a square root.
Step-3: P is selected such that $$P <= (pi/h - A)/JJnorm$$

Adaptation of A, h and P: As evident from Step-3, P, A and h are interrelated. For example in a typical algorithm, once the kinematic structure is defined (or the skeleton frame in computer animation is defined), then:
Step-1: A is fixed, to for example $$A = -20$$

Step-2: h is fixed to for example $$h = 0.02$$

Step-3: P is computed from $$P <= (pi/h - A)/JJnorm$$

Step-4: Dummy trajectories for the end effector are defined and executed with the above values. By monitoring the number of iterations needed to settle at the desired values by computing Eqns. 9d and 9e, P is adjusted and increased to reduce the number of iterations. If the response is unstable (dq growing uniformly) then h is reduced.

Step-5: Once a stable response is achieved, A is adjusted to improve on the number of iterations. A is typically increased to reduce the number of iterations.

The above adaptation algorithm is executed only once for a given skeleton.

Practical implementation of Feedback Inverse Kinematics (For a Fixed Sampling Interval)

The FIK algorithm defined in (Eq.9a-9c) works as a filter and requires only multiply and accumulate instructions. The filter form of the algorithm is shown in FIG. 5.

A practical implementation of the Feedback Inverse Kinematics algorithm is described below.

Step-0 (initialisation):
set $(z(k-1))$ to a zero vector from a dimension (m)
set $(dq(t-1))$ to a zero vector from a dimension (n)

Step-1: Compute the Jacobian $(J(q))$ using current values for (q) provided as such by some measurements from a sensor (camera, motor optical encoder, motor tachometer or other) or by a mathematical model. The Jacobian depends on the structure of the system for which the inverse kinematics problem is solved. Typically the Jacobian is constructed from scalars and trigonometric functions such as $\sin(q)$ and $\cos(q)$ that depend on (q). The Jacobian has a dimension (m) times (n). Computing the Jacobian consists of substituting (q) with its numerical form, solving each element of $(J(q))$ and generating a numerical matrix from a dimension (m) times (n).

Step-2: Compute $$dx=J(q)dq(t-1)$$

using the multiplication means, the addition means and store the result into (dx) using the means for storing (dx). This gives a vector (dx) with a dimension (m)

Step-3: Compute the error in (Eq.9a) by subtracting the result from Step-2 from (dxd), i.e.

$$e=dxd-dx$$

using the subtraction means. Use the store means to store the result into (e)

Step-4: Use the store means (P) and the store means $(z(t-1))$ to compute (P) times $(z(t-1))$; store the result in (tmp).

$$tmp=Pz(t-1)$$

This operation uses the store means, the multiplication means and the addition means. Use the means for storing (tmp) to store (tmp) which is a vector with a dimension (m)

Step-5: Multiply the transpose of the Jacobian $(Jt(q))$ by (tmp) as computed in Step-4 to derive (dq) in (Eq.9c)

$$dq=Jt(q)tmp$$

This operation uses the multiplication means, the addition means and the means for storing (dq).

Step-6: Compute z(t) from (Eq.9b) using $(z(t-1))$, (A) and (e) as computed at Step-3

$$z(t)=Az(t-1)+e$$

This operation uses the addition means, the multiplication means and the means for storing (z(t))

Step-7: Set $$z(t-1)=z(t)$$

$$dq(t-1)=dq$$

This operation uses the means for storing $(z(t-1))$ and $(dq(t-1))$. These values will be used for the next iteration of the IK algorithm that will take place after (dt) seconds.

Step-8: Use (dq) from Step-5 as the solution to the IK problem. Continue from Step-1 at the next iteration which will take place after (dt) number of seconds.

Figure 6:
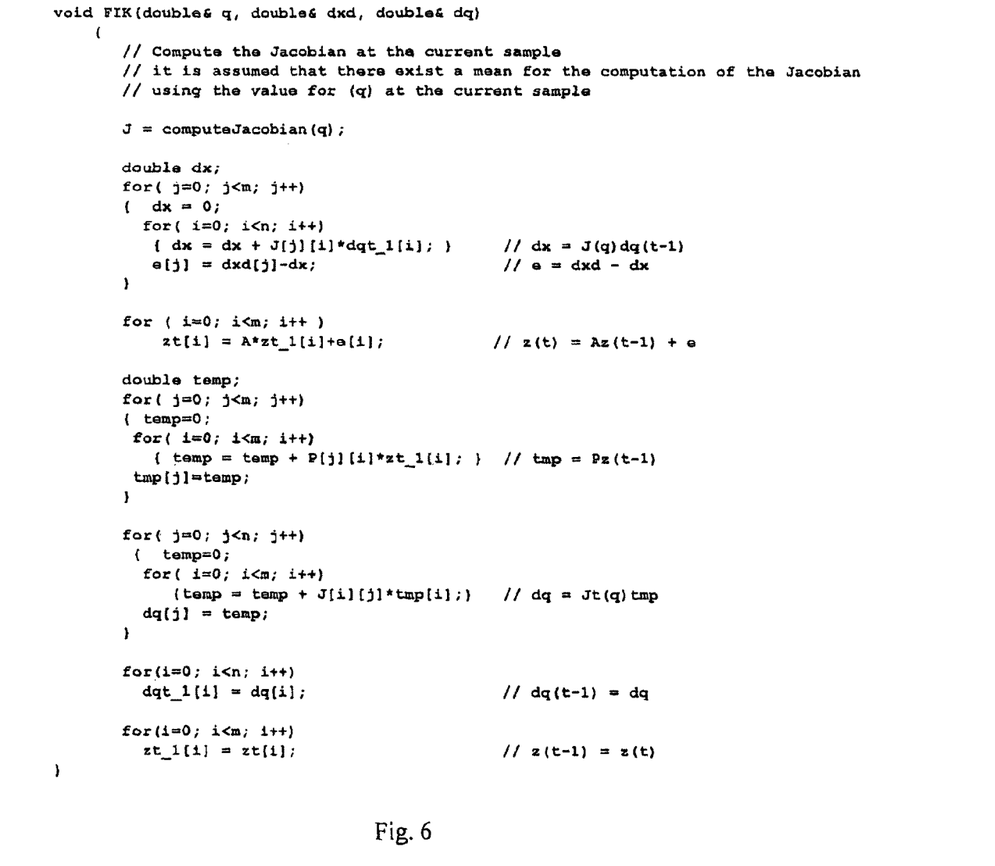
FIG. 6 includes an example of a C code that implements the algorithm of the inverse kinematics problem described in this invention.

A computer software programme using C-language instructions that implements the above algorithm for a generic inverse kinematics problem is shown in FIG. 6. The total number of operations is equal to $$2*m*m+2*m-1+n*(2m-1) \qquad (21)$$

If (m=6), then (83+11*n) operations are necessary to compute the inverse of the Jacobian and solve the IK problem.

If (m=12) and (n=25) then (886) operations are necessary to compute the inverse of the Jacobian and solve the IK problem.

Practical Implementation of Feedback Inverse Kinematics (for a Variable Sampling Interval)

Considering application using variable sampling intervals, the following algorithm can be used Step-0 and Step-1 are as above Step-3: Compute Eq. 9d $$dq=Jt(q)Pz(t-1)$$

Using the transpose of the Jacobian Jt(q), P and z(t-1).

Step-4: Compute Eq. 9e $$z(t)=z(t-1)+h(Az(t-1)-J(q)dq)+h\ dxd$$

Using the Jacobian J(q), A, z(t-1), h and dxd; Practically z(t) is the value for z(t-1) that must be used for the following iteration in Step-3.

Use dq from Step-3 as the solution to the inverse kinematics problem at this iteration. Repeat the above steps until dq is reduced to a small value below a threshold or/and the end points or end-effectors reach the targets.

In total, $2*m*n+4*m$ multiplications and $2*m*n-n+2*m$ additions per iteration are used to compute the solution to the inverse kinematics problem. As evident, the complexity in the computation is linear in m and n.

It has been reported by Y. Nakamura and H. Hanafusa, "Inverse kinematic solutions with singularity robustness for robot manipulator control", Journal of Dynamic systems, Measurements and Control, Vol. 108, September 1986, that for the above operations, a minimum of 6000 instructions, including an instruction for division which will consume additional multiply and accumulate instructions, will be necessary to compute the IK problem for the same dimension (m=12) and (n=25). Therefore the proposed algorithm gives a reduction in the computational load by a factor of at least seven. Some estimated values for the computational load based on traditional IK methods can be also found in A. A. Maciejewski and J. M. Reagin, "Parallel Algorithm and Architecture for the control of kinematically redundant manipulators", Robotics and Automation, IEEE Transactions on, Volume 10, Issue 4, August 1994 Page(s):405-414. Again, a minimum reduction by a factor of ten can be achieved by the proposed algorithm in this invention in comparison to the numbers presented in this paper.

The total number of operations listed in (Eq.21) is included for demonstration purposes only and assumes that the Jacobian (J(q)) has a full structure with non zero elements. This can be further optimised by using a more efficient implementation where the zero elements of (J(q)) are appropriately accounted for in the algorithm.

Also (P) can be made diagonal with a proper adjustment of (J(q0)).

The implementation can be also improved by taking a parallel, multiprocessing approach by utilising two or more processing blocks. The algorithm proposed in this invention is suitable for implementation on parallel architectures without additional overhead. This can be done using several approaches. For example:

Considering FIG. 6, the computation of (e(t)) and (z(t)) can be run in parallel to the computation of (tmp) and (dq) on architectures comprising two processing blocks.

Considering the computation of (J(q)dq(t−1)) for example, (J(q)), which has a dimension of (m) times (n) can be partitioned as $$J(q) = \begin{vmatrix} \text{row 1} \\ \text{row 2} \\ \text{row 3} \\ \ldots \\ \text{row } m \end{vmatrix}$$

where each row has (n) elements. Each row can be multiplied in parallel by (dq(t−1)). Therefore if the system has (m) number of processors available, each processor will be multiplying in parallel each row in (J(q)) by (dq(t−1)), which results in running the loop (m) times faster than running it on a single processor.

The same conclusion holds for the computations in Step-4 and Step-5 in the algorithm above. This can be performed by a zero increase in overhead by appropriately constructing the memory pointers for the results of the multiplications.

Null-Motion for Defining Joint Constraints, Joint Limits, Trajectory and Environmental Constraints as Well as for Motion Retargeting.

For introducing joint constraints, joint limits, environmental constraints as well as motion retargeting, an additional homogeneous term is added to the main solution in Eq 2:

$$dq=iJ(q)dxd+[I-iJ(q)J(q)]dq0 \qquad (22)$$

Figure 6A:
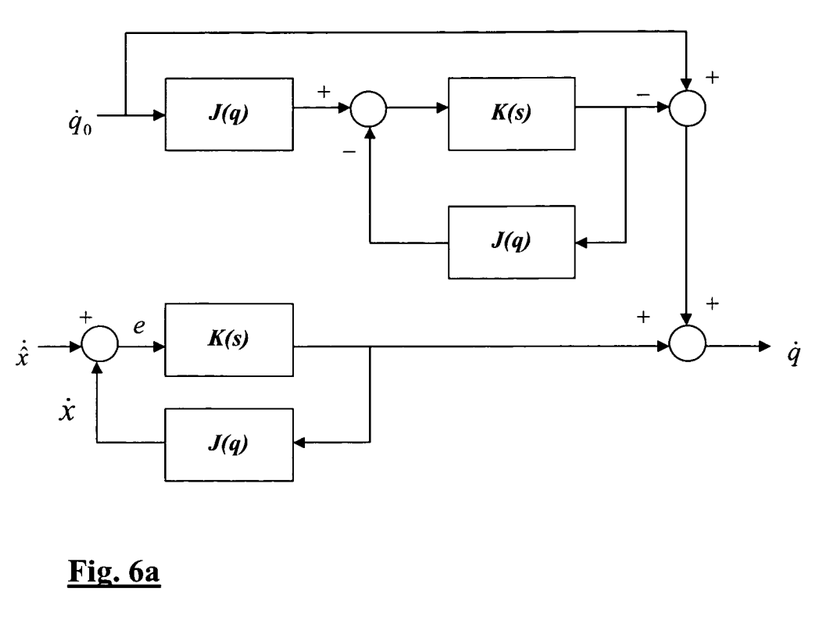
FIG. 6a represents a feedback inverse kinematics solution according to a further embodiment of the invention.

The new homogeneous term [I−iJ(q)J(q)]dq0 can be also computed by the feedback form proposed above by replacing iJ(q) by the feedback form in FIG. 4, giving a processing system as shown in FIG. 6a.

The full solution, considering computer animation and a non-fixed sampling interval, can be then modified to:

$$bdq=Jt(q)Pbz(t-1) \qquad (9f)$$

$$bz(t)=bz(t-1)+h(A\,bz(t-1)-J(q)bdq)+h\,J(q)dq0 \qquad (9j)$$

The final joint velocities are then $$dq\_\text{full}=dq-bdq+dq0$$

where dq is computed from Eq. 9D, bdq is computed from Eq. 9f and dq0 is computed depending on the given constraint, for example to limit the joint motion, for example in motion retargeting, for a given joint number (k):

$$dq0(k)=\text{gain}*(bq(k)-q(k))$$

where bq(k) is the desired value for the joint (this can be a constant or a time varying function), q(k) is the current value of the joint variable (k) and gain is a positive constant to be selected.

In equation (22) the term iJ(q)dxd can be considered as a primary demand and the additional term [I−iJ(q)J(q)]dq0 can be considered as a secondary demand, and dq0 represents the secondary demand variables. Therefore, for example, dq0 can be set so as to prevent movement of one or more of the joints such as limits that are placed on how q can vary for each of the joints, or some movements dxd for some links that might have lower priority or the position of the centre of gravity or the momentum about the centre of gravity or the desired trajectories for the joints (retargeting). This will means that some joints, for example those representing the feet of a character in an animation system such as that if FIG. 2, can be fixed with higher priority, while the other bones can be allowed to move slightly from the target if lower priority.

It will further be appreciated that the kinematics algorithms described above can be modified take into account the dynamics of the system being controlled. For example, where the system is an animated figure as in FIG. 2, the dynamics of the system will include torques about each joint caused by the weight of the other joints, which can be assigned to them as part of the algorithm, as well as the effects of movement of the centre of gravity. In such a system, in equation (2), J(q) becomes a matrix having additional rows A(q), $A_1$(q) and $A_2$(q) and dxd becomes a vector having additional elements dxd, which are the desired joint positions, $dx_{cog}d$, which is the position of the centre of gravity, and τ which represents the torques about the centre of mass's pivot point.

Figure 7:
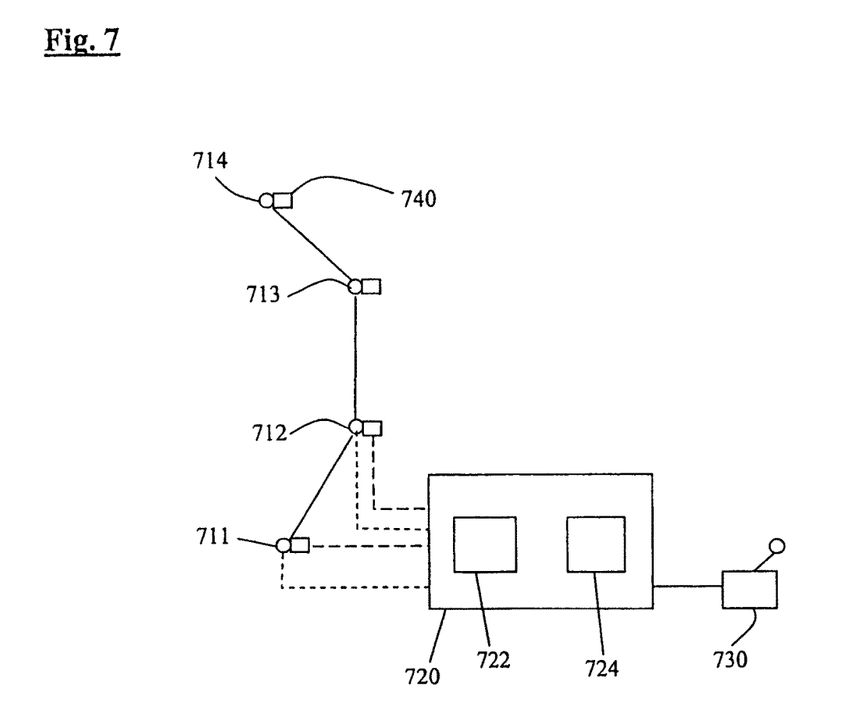
FIG. 7 is a schematic view of a robot and control system according to an embodiment of the invention.

Referring to FIG. 7, one embodiment of the invention comprises a robot comprising an end effector 714 and three joints 711, 712, 713. This robot therefore corresponds to that of FIG. 1. Each joint has three degrees of freedom, and includes three actuators, each controlling motion in one of the degrees of freedom. A control system comprises a computer 720 including a processor 722 arranged to provide all the processing means required, and memory 724 arranged to include all of the storage means required. An input, in this case in the form of a user input 730, is arranged to generate inputs to the computer 720 indicative of the desired movement of the end effector 714. Sensors 740 are arranged to measure the position and movement of the joints 711, 712, 713 and provide signals to the computer 720 indicative thereof. The computer is arranged to control the actuators associated with the joints 711, 712, 713 using one of the methods described above.

Figure 8:
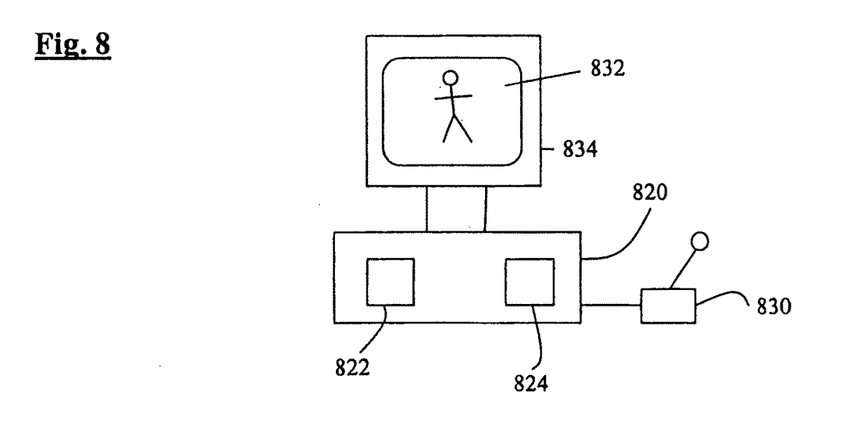
FIG. 8 is a schematic view of a graphics display system according to an embodiment of the invention.

Referring to FIG. 8, a further embodiment of the invention comprises a PC 820 including a processor 822 and a memory 824. The computer is connected to display 826 and a user input 830. The memory 824 has instructions stored in it to enable a user to play a game on the computer in which a graphic image 832 is on a display 834 controlled to move in response to inputs from the user input 830. The computer is arranged to control movement of the image, which may include a figure corresponding to that of FIG. 2, in response to input signals from the user input 830, using one of the methods described above.

The methods described above can also be used in the field of protein folding. Various proposals have been made kinematically manipulate the folding of protein molecules. These can be used to calculate the conformations of a molecule based on the constraints of the bonds in the molecule. They can also be used to design nanomachines in which complex molecules are used to perform specific functions. The control of such systems can be performed according to embodiments of this invention in a manner analogous to that described above for robotics, with atoms or groups of atoms in the molecule forming the controlling mechanisms corresponding to the joints in the robot.

The invention claimed is:

1. A real-time method for controlling a display system comprising:
   providing a display system arranged to display an image of a movable object, the display system including a processor operatively coupled to a memory and to a display, wherein the image of the movable object is represented by one or more elements coupled by one or more joints, the joints having at least one variable parameter (dq), the elements having a trajectory (dx) which is controlled by the joints, wherein the trajectory (dx) is related to the variable parameters (dq) by a variable matrix (J);

defining, using said processor, a control transfer matrix (K) relating the variable parameters (dq) to the trajectory (dx), and generating, using said processor, values of (dq) for each of a series of samples, wherein for each of the samples the values of (dq) are generated using the control transfer matrix (K) and a feedback loop in which a feedback term is computed that is dependent on an error (e) which is the difference between a desired trajectory (dxd) and a current trajectory (dx);

wherein said values of (dq) are generated using:

$$dq = Jt(q)*P*z(t-1)$$

$$z(t) = z(t-1) + h*A*z(t-1) - h*J(q)*dq + h*dxd$$

where:
* is multiplication symbol
J is the variable matrix,
Jt is the transpose of J,
dq is a variable parameter,
z(t) is a vector of state variables from a dimension (m),
z(t−1) is a vector of state variables from a dimension (m) computed at a previous iteration,
dxd is a desired trajectory,
q is a variable parameter,
A is a negative definite diagonal matrix or a negative constant,
P is a positive definite full matrix or a positive diagonal matrix or a positive constant,
h is a positive constant,
t is current time or a discrete sampling time, and
(t−1) is the time at the previous iteration.

2. A method according to claim 1 wherein the variable matrix is a Jacobian matrix.

3. A method according to claim 1 wherein the feedback term is computed repeatedly over a number of cycles so that the current trajectory approaches the desired trajectory.

4. A method according to claim 1 wherein the variable parameters (dq) output by the control transfer matrix (K), are in the form of a vector which has a dimension specified as (n), the desired trajectory dxd is in the form of a vector which has a dimension (m) and (m) is less than or equal to (n).

5. A method according to claim 4 including selecting the control transfer matrix (K) which has a dimension (m) times (n) and determining the form and the numerical values of (K) depending on the properties of the system.

6. A method according to claim 1 arranged to be performed on a single processor or on a parallel platform.

7. A method according to claim 1, wherein the variable matrix is a Jacobian matrix (J(q)), wherein (J(q)) can become rank deficient and control transfer matrix (K) is arranged to deliver solutions for (dq) even when (J(q)) becomes rank deficient.

8. A method according to claim 1, wherein the variable matrix is a Jacobian matrix (J(q)), wherein (J(q)) can approach a singular state, and when the singular state is approached the full structure of (K) generates non-zero solution for (dq) that produce motion which steers the trajectory away from the singular state.

9. A real-time method for controlling a display system comprising:

defining, using a processor, a control transfer matrix (K) relating at least one variable parameter (dq) to a trajectory (dx), and generating, using said processor, values of (dq) for each of a series of samples, wherein for each of the samples the values of (dq) are generated using the control transfer matrix (K) and a feedback loop in which a feedback term is computed that is dependent on an error (e) which is the difference between a desired trajectory (dxd) and a current trajectory (dx);

wherein said display system is arranged to display an image of a movable object, the display system includes said processor operatively coupled to a memory and to a display, wherein the image of the movable object is represented by one or more elements coupled by one or more joints, the joints having the at least one variable parameter (dq), the elements having the trajectory (dx) which is controlled by the joints, wherein the trajectory (dx) is related to the variable parameters (dq) by a variable matrix (J);

wherein said values of (dq) are generated using:

$$dq = Jt(q)*P*z(t-1)$$

$$z(t) = z(t-1) + h*A*z(t-1) - h*J(q)*dq + h*dxd$$

where:
* is multiplication symbol
J is the variable matrix,
Jt is the transpose of J,
dq is a variable parameter,
z(t) is a vector of state variables from a dimension (m),
z(t−1) is a vector of state variables from a dimension (m) computed at a previous iteration,
dxd is a desired trajectory,
q is a variable parameter,
A is a negative definite diagonal matrix or a negative constant,
P is a positive definite full matrix or a positive diagonal matrix or a positive constant,
h is a positive constant,
t is current time or a discrete sampling time, and
(t−1) is the time at the previous iteration.

10. A method according to claim 9 wherein the variable matrix is a Jacobian matrix.

11. A method according to claim 9 wherein the feedback term is computed repeatedly over a number of cycles so that the current trajectory approaches the desired trajectory.

12. A method according to claim 9 wherein the variable parameters (dq) output by the control transfer matrix (K), are in the form of a vector which has a dimension specified as (n), the desired trajectory dxd is in the form of a vector which has a dimension (m) and (m) is less than or equal to (n).

13. A method according to claim 12 including selecting the control transfer matrix (K) which has a dimension (m) times (n) and determining the form and the numerical values of (K) depending on the properties of the system.

14. A method according to claim 9 arranged to be performed on a single processor or on a parallel platform.

15. A method according to claim 9, wherein the variable matrix is a Jacobian matrix (J(q)), wherein (J(q)) can become rank deficient and control transfer matrix (K) is arranged to deliver solutions for (dq) even when (J(q)) becomes rank deficient.

16. A method according to claim 9, wherein the variable matrix is a Jacobian matrix (J(q)), wherein (J(q)) can approach a singular state, and when the singular state is approached the full structure of (K) generates non-zero solution for (dq) that produce motion which steers the trajectory away from the singular state.

17. A real-time method for controlling a display system arranged to display an image of a movable object, the display system including a processor operatively coupled to a memory, to a user input, and to a display, wherein said image on said display is controlled to move in response to a control signal from said user input, wherein the image of the movable object is represented by one or more elements coupled by one or more joints, the joints having at least one variable parameter (dq), the elements having a trajectory (dx) which is controlled by the joints, wherein the trajectory (dx) is related to the variable parameters (dq) by a variable matrix (J);

the method of controlling the display system comprising:
receiving a control signal from said user input, the control signal being indicative of a desired trajectory (dxd);
defining, using said processor, a control transfer matrix (K) relating the variable parameters (dq) to the trajectory (dx), and
generating, using said processor, values of (dq) for each of a series of samples, wherein for each of the samples the values of (dq) are generated using the control transfer matrix (K) and a feedback loop in which a feedback term is computed that is dependent on an error (e) which is the difference between said desired trajectory (dxd) and a current trajectory (dx);
wherein said values of (dq) are generated using:

$dq = Jt(q)*P*z(t-1)$ $z(t) = z(t-1) + h*A*z(t-1) - h*J(q)*dq + h*dxd$ where:
* is multiplication symbol
J is the variable matrix,
Jt is the transpose of J,
dq is a variable parameter,
z(t) is a vector of state variables from a dimension (m),
z(t−1) is a vector of state variables from a dimension (m) computed at a previous iteration,
dxd is a desired trajectory,
q is a variable parameter,
A is a negative definite diagonal matrix or a negative constant,
P is a positive definite full matrix or a positive diagonal matrix or a positive constant,
h is a positive constant,
t is current time or a discrete sampling time, and
(t−1) is the time at the previous iteration.

18. A method according to claim 17 wherein the variable matrix is a Jacobian matrix.

19. A method according to claim 17, wherein the variable matrix is a Jacobian matrix (J(q)), wherein (J(q)) can become rank deficient and control transfer matrix (K) is arranged to deliver solutions for (dq) even when (J(q)) becomes rank deficient.

20. A method according to claim 17, wherein the variable matrix is a Jacobian matrix (J(q)), wherein (J(q)) can approach a singular state, and when the singular state is approached the full structure of (K) generates non-zero solution for (dq) that produce motion which steers the trajectory away from the singular state.

* * * * *